United States Patent
Tang et al.

(10) Patent No.: US 10,615,909 B2
(45) Date of Patent: Apr. 7, 2020

(54) TERMINAL, BASE STATION, AND DATA TRANSMISSION METHOD

(71) Applicant: Huawei Technologies Co., Ltd., Shenzhen (CN)

(72) Inventors: Hao Tang, Shanghai (CN); Guohua Zhou, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/022,040

(22) Filed: Jun. 28, 2018

(65) Prior Publication Data

US 2018/0309539 A1 Oct. 25, 2018

Related U.S. Application Data

(63) Continuation of application No. PCT/CN2015/100202, filed on Dec. 31, 2015.

(51) Int. Cl.
*H04L 1/00* (2006.01)
*H04L 5/00* (2006.01)
(Continued)

(52) U.S. Cl.
CPC .......... *H04L 1/0027* (2013.01); *H04L 1/0013* (2013.01); *H04L 5/0007* (2013.01);
(Continued)

(58) Field of Classification Search
CPC ............ H04W 72/121; H04W 72/1273; H04L 5/0094
See application file for complete search history.

(56) References Cited

U.S. PATENT DOCUMENTS 8,990,656 B2\* 3/2015 Jang ............... H04L 1/0061
714/758
2007/0104150 A1 5/2007 Fernandez-Corbaton et al.
(Continued)

FOREIGN PATENT DOCUMENTS

CN 101273551 A 9/2008
CN 102612090 A 7/2012
(Continued)

OTHER PUBLICATIONS

Huawei, Hisilicon, "Control signaling enhancements for short TTI," 3GPP TSG RAN WG1 Meeting #83, Anaheim, USA, Nov. 15-22, 2015, R1-156461, 6 pages.
(Continued)

*Primary Examiner* — Melanie Jagannathan
(74) *Attorney, Agent, or Firm* — Slater Matsil, LLP

(57) ABSTRACT

This disclosure relates to the mobile communications field, and in particular, to data transmission technologies in the mobile communications field. In a data transmission method, a base station allocates, to a terminal, some of time domain symbols that are used for data transmission and that are in a scheduling period of the terminal, and the terminal performs data transmission based on the allocated time domain symbols. According to the method, time domain symbols in the scheduling period that originally belong to the terminal are punctured, a resource waste caused when the terminal occupies all time domain symbols that are used for data transmission and that are in the scheduling period during scheduling each time can be avoided, so that radio resources can be flexibly allocated based on requirements on delays and bandwidth, thereby improving resource utilization.

18 Claims, 11 Drawing Sheets

(51) Int. Cl.
*H04W 28/06* (2009.01)
*H04W 72/04* (2009.01)
*H04W 72/12* (2009.01)

(52) U.S. Cl.
CPC .......... *H04L 5/0044* (2013.01); *H04L 5/0048* (2013.01); *H04L 5/0053* (2013.01); *H04L 5/0091* (2013.01); *H04W 28/06* (2013.01); *H04W 72/0446* (2013.01); *H04W 72/1205* (2013.01); *H04W 72/042* (2013.01)

(56) References Cited

U.S. PATENT DOCUMENTS

| | | | | |
|---|---|---|---|---|
| 2008/0307427 | A1* | 12/2008 | Pi | H03M 13/27 718/104 |
| 2009/0103497 | A1 | 4/2009 | Fernandez-Corbaton et al. | |
| 2011/0194523 | A1* | 8/2011 | Chung | H04L 5/0053 370/329 |
| 2012/0008574 | A1* | 1/2012 | Xiao | H04L 1/0007 370/329 |
| 2012/0121031 | A1* | 5/2012 | Tang | H04B 7/046 375/267 |
| 2012/0134338 | A1* | 5/2012 | Ko | H04L 5/0048 370/330 |
| 2014/0161088 | A1* | 6/2014 | Seo | H04L 5/0044 370/329 |
| 2014/0286255 | A1 | 9/2014 | Nam et al. | |
| 2015/0334685 | A1 | 11/2015 | Ji et al. | |
| 2015/0349929 | A1 | 12/2015 | Bhorkar et al. | |
| 2017/0187499 | A1* | 6/2017 | Hwang | H04L 5/0051 |
| 2017/0245272 | A1* | 8/2017 | Li | H04W 72/04 |
| 2018/0205518 | A1* | 7/2018 | Cheng | H04L 5/1469 |
| 2018/0206250 | A1* | 7/2018 | Lee | H04W 72/121 |

FOREIGN PATENT DOCUMENTS

| | | |
|---|---|---|
| JP | 2009505518 A | 2/2009 |
| JP | 2011501928 A | 1/2011 |
| WO | 2015179136 A1 | 11/2015 |
| WO | 2015187623 A2 | 12/2015 |
| WO | 2016061382 A1 | 4/2016 |

OTHER PUBLICATIONS

ZTE, "L1 considerations on latency reduction," 3GPP TSG RAN WG1 Meeting #83, Anaheim, USA, Nov. 15-22, 2015; R1-157151, 6 pages.

* cited by examiner

TERMINAL, BASE STATION, AND DATA TRANSMISSION METHOD

CROSS-REFERENCE TO RELATED APPLICATIONS

This application is a continuation of International Application No. PCT/CN2015/100202, filed on Dec. 31, 2015, the disclosure of which is hereby incorporated by reference in its entirety.

TECHNICAL FIELD

The present disclosure relates to the field of communications technologies, and in particular, to a terminal, a base station, a data transmission method.

BACKGROUND

In a Long Term Evolution (LTE) network, time-frequency resources are allocated to a terminal by using a transmission time interval (TTI) as a unit. In other words, the terminal is scheduled at a period of a TTI. This scheduling mode is referred to as a TTI scheduling mode, and is a conventional scheduling mode. In different network configurations, values of a TTI may be different in terms of time. Usually, one TTI is equal to one millisecond (ms) in terms of time. In an LTE frequency division duplex (FDD) network, duration from a time point at which a base station sends data to a terminal to a time point at which the terminal feeds back a response is 8 ms. In other words, there is a delay of 8 ms from a time point at which the base station sends the data to a time point at which the base station learns whether the data is successfully sent.

With popularization of LTE networks, various services such as high-definition videos and virtual reality develop rapidly. Emergence of these services imposes requirements for higher bandwidth and lower delays on the LTE networks. In an LTE network, one subframe in a time domain corresponds to one TI, one subframe consists of two timeslots (slot), and each timeslot occupies 0.5 ms. One timeslot consists of a plurality of symbols (symbol). When a normal cyclic prefix is configured, one timeslot includes seven symbols, and when an extended cyclic prefix is configured, one timeslot includes six symbols. In view of this, to reduce delays, a new scheduling mode: a shorter TTI scheduling mode is provided. To be specific, a terminal is scheduled at a period of time less than one millisecond, for example, one slot or one symbol. In an LTE FDD network, using an example in which a terminal is scheduled at a period of one symbol, duration from a time point at which a base station sends data to the terminal to a time point at which the terminal feeds back a response is reduced to eight symbols. In other words, there is a delay of eight symbols from a time point at which the base station sends the data to a time point at which the base station learns whether the data is successfully sent, so that the delay is less than one millisecond. It can be learned that a delay time is dramatically reduced after the shorter TTI scheduling mode is applied.

When the foregoing two scheduling modes exist in a same LTE network, a radio resource waste is caused.

SUMMARY

This disclosure describes a terminal, a base station, and a data transmission method, to improve radio resource utilization, and especially to improve radio resource utilization of a wireless network that has different scheduling periods.

According to a first aspect, an embodiment of the present disclosure provides a data transmission method. The method includes sending, by a base station, first time domain symbol configuration information. The first time domain symbol configuration information indicates a first time domain symbol allocated to a first terminal in a scheduling period. The scheduling period comprises a plurality of time domain symbols used for data transmission. The plurality of time domain symbols comprises the first time domain symbol and a second time domain symbol not allocated to the first terminal. The data transmission method further includes performing, by the base station, data transmission with the first terminal based on the first time domain symbol.

In a possible design, the base station may send a reference signal to the first terminal in the first time domain symbol or the second time domain symbol. This design can be compatible with an original reference signal sending manner, so that transmission quality of the first terminal can be ensured.

In another possible design, the base station may further send second time domain symbol configuration information to a second terminal. The second time domain symbol configuration information is used to indicate a time domain symbol allocated to the second terminal in the scheduling period. For example, the second time domain symbol may be allocated to the second terminal, or a part of the second time domain symbol may be allocated to the second terminal. According to this design, radio resources can be fully used, thereby avoiding a radio resource waste.

In still another possible design, quantities of first time domain symbols or second time domain symbols may be determined based on transmission requirements of the first terminal or the second terminal, for example, requirements on bandwidth and delays. According to this design, radio resources can be properly distributed.

In still another possible design, a transport block size of the first terminal in the scheduling period may be determined based on the quantity of the first time domain symbols. Similarly, a transport block size of the second terminal in the scheduling period may be determined based on the quantity of the second time domain symbols allocated to the second terminal.

In still another possible design, the first time domain symbol configuration information may be carried in downlink control information and sent to the first terminal. According to this design, time domain symbol configuration information may be sent each time the first terminal is scheduled, so that flexibility of symbol allocation is improved. Similarly, the second time domain symbol configuration information may be carried in downlink control information and sent to the second terminal.

In still another possible design, the time domain symbol configuration information may be carried in a signaling message and sent to the first terminal, for example, carried in a Radio Resource Control message or a broadcast message. In this design, the first terminal may store the received time domain symbol configuration information. Each time the first terminal is scheduled, the first terminal determines an allocated time domain symbol by using the time domain symbol configuration information. Subsequently, after the first terminal receives time domain symbol configuration information again, the first terminal may update the locally stored time domain symbol configuration information. According to this design, semi-static scheduling of time domain symbols is implemented, thereby reducing signaling overheads. Similarly, the second time domain symbol configuration information may be carried in a signaling message and sent to the second terminal.

In still another possible design, different configurations used to indicate the first time domain symbol may be preconfigured on the first terminal, for example, a configuration 1: "symbols 1-3", and a configuration 2: "symbols 3-10". Correspondingly, the first time domain symbol configuration information may include a time domain symbol configuration identifier, and the identifier is used to identify a configuration preconfigured on the first terminal. In this way, signaling overheads can be reduced. Similarly, this design may also be applied to the second time domain symbol configuration information.

In still another possible design, for downlink transmission, the time domain symbols used for data transmission do not include a symbol occupied by a physical downlink control channel. In other words, the symbol occupied by the physical downlink control channel is not allocated to the second terminal. According to this design, it can be ensured that control information can be correctly sent to the first terminal.

In still another possible design, for uplink transmission, the time domain symbols used for data transmission do not include a symbol occupied by a demodulation reference signal. In other words, the symbol occupied by the demodulation reference signal is not allocated to the second terminal. The demodulation reference signal is a reference signal that is sent by the terminal to which the scheduling period belongs to the base station. According to this design, the base station can correctly demodulate uplink data sent by the terminal or estimate channel quality.

According to a second aspect, an embodiment of the present disclosure provides a data transmission method. The method includes: receiving, by a first terminal, time domain symbol configuration information from a base station, where the time domain symbol configuration information is used to indicate a first time domain symbol allocated to the first terminal in a scheduling period; performing, by the first terminal, data transmission based on the first time domain symbol, where the scheduling period includes a plurality of time domain symbols used for data transmission, and the plurality of time domain symbols used for data transmission include the first time domain symbol and a second time domain symbol not allocated to the first terminal. In other words, the base station allocates, to the first terminal, some of the time domain symbols that are used for data transmission and that are in the scheduling period, and the first terminal performs data transmission with the base station in the scheduling period based on the allocated time domain symbol, for example, sends data to the base station or receives data from the base station. According to the method, a terminal can perform data transmission in some of the time domain symbols in the scheduling period, so that data transmission of the terminal in the scheduling period is more flexible, thereby improving resource usage effectiveness.

In the second aspect, for related possible designs, refer to various possible designs in the first aspect, and details are not described herein again.

According to a third aspect, an embodiment of the present disclosure provides a base station. The base station a transceiver configured to send first time domain symbol configuration information, where the first time domain symbol configuration information indicates a first time domain symbol allocated to a first terminal in a scheduling period. The scheduling period comprises a plurality of time domain symbols used for data transmission. The plurality of time domain symbols comprise the first time domain symbol and a second time domain symbol not allocated to the first terminal. The base station also includes a processor and a memory comprising a program to be executed in the processor. The program comprises instructions configured to control the transceiver to perform data transmission with the first terminal based on the first time domain symbol.

In a possible design, a structure of the base station includes a processor and a transceiver. The processor is configured to support the base station to perform corresponding functions in the foregoing methods. The transceiver is configured to: support communication between the base station and a terminal, and send information or an instruction used in the foregoing methods to the terminal. The base station may further include a memory. The memory is configured to: couple to the processor, and store a necessary program instruction and data of the base station.

According to a fourth aspect, an embodiment of the present disclosure provides a terminal. The terminal a transceiver configured to receive time domain symbol configuration information, where the time domain symbol configuration information indicates a first time domain symbol allocated to the terminal in a scheduling period. The scheduling period comprises a plurality of time domain symbols used for data transmission. The plurality of time domain symbols comprises the first time domain symbol and a second time domain symbol not allocated to the terminal. The terminal further includes a processor and a memory comprising a program to be executed in the processor. The program comprises instructions configured to control the transceiver to perform data transmission based on the first time domain symbol.

In a possible design, a structure of the terminal includes a transceiver and a processor. The transceiver is configured to support the terminal to receive time domain symbol configuration information sent by the base station. The processor controls the transceiver to perform data transmission with the base station based on a first symbol indicated by the time domain symbol configuration information.

According to a fifth aspect, an embodiment of the present disclosure provides a communications system. The system includes the base station and the terminal according to the foregoing aspects.

According to a sixth aspect, an embodiment of the present disclosure provides a computer storage medium, configured to store a computer software instruction used by the base station. The computer software instruction includes a program designed to perform the foregoing aspects.

According to a seventh aspect, an embodiment of the present disclosure provides a computer storage medium, configured to store a computer software instruction used by the foregoing terminal. The computer software instruction includes a program designed to perform the foregoing aspects.

According to the embodiments of the present disclosure, in the scheduling period of the terminal, not all the time domain symbols are allocated to the terminal, but instead, some of the time domain symbols are allocated to the terminal for data transmission. This is equivalent to that the time domain symbol that originally belongs to the terminal is punctured, the terminal occupies the time domain symbol that is not punctured for data transmission, and the punctured time domain symbol may be allocated to another terminal, so that data transmission between the terminal and the base station is more flexible in the scheduling period. Therefore, the radio resources can be properly allocated based on requirements on delays and bandwidth, thereby improving resource utilization.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF ILLUSTRATIVE EMBODIMENTS

Figure 1:
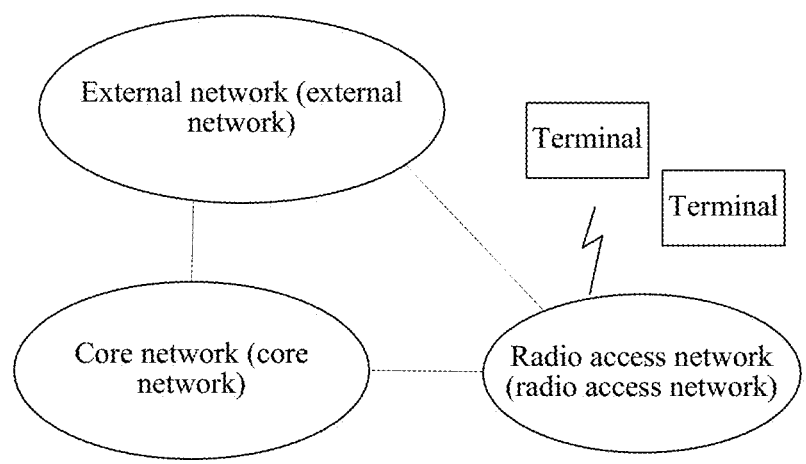
FIG. 1 is a diagram of an architecture of a wireless network according to an embodiment of the present disclosure.

FIG. 1 is a diagram of an architecture of a wireless network according to an embodiment of the present disclosure. As shown in FIG. 1, a terminal can access an external network by using a radio access network (radio access network, RAN) and a core network (CN). With development of technologies, the terminal may alternatively directly access an external network by using a radio access network. The technical solution described in the embodiments of the present disclosure may be applicable to a communications network in which radio resources can be divided in a time domain. An architecture of the communications network may be shown in FIG. 1. The communications network may be a radio communications network using various radio access technologies, for example, a network using access technologies such as Code Division Multiple Access, Frequency Division Multiple Access, Time Division Multiple Access, orthogonal frequency division multiple access, single-carrier Frequency Division Multiple Access, and various subsequent evolved networks such as 4.5G (generation) network, 5G network, and Internet of Things.

In this disclosure, nouns "network", "wireless network", and "system" are usually alternately used, but a person skilled in the art can understand their meanings.

In this disclosure, "plurality of" means "two or more".

Terminals (terminal) used in this disclosure may include various handheld devices, in-vehicle devices, wearable devices, and computing devices that have a radio communications function, or other processing devices connected to a radio modem, and various forms of user equipment (UE), mobile stations (MS), terminal equipment (TE), and the like. For ease of description, in this disclosure, the above-mentioned devices are collectively referred to as terminals.

A base station (BS) used in this disclosure is an apparatus that is deployed in a radio access network and that is configured to provide a radio communications function for a terminal. The base station may include various forms of macro base stations, micro base stations, relay stations, access points, and the like. In a system using different radio access technologies, names of devices that have base station functions may be different. For example, in an LTE network, the device referred to as an evolved node B (eNB, or eNodeB for short) is referred to as a node B (Node B) in a 3G network. For ease of description, in this disclosure, the foregoing apparatus providing a radio communications function for a terminal is collectively referred to as a base station or a BS.

Data transmission used in this disclosure is data transmission performed by using a data channel. Data transmission includes uplink data transmission and downlink data transmission. The uplink data transmission means that a terminal sends data to a base station. A radio resource used for uplink data transmission may be referred to as an uplink data resource. The uplink data transmission is a type of uplink transmission. The downlink data transmission means that the base station sends data to the terminal. A radio resource used for downlink data transmission is referred to as a downlink data resource. The downlink data transmission is a type of downlink transmission. In an LTE network, a data channel used for downlink data transmission is a physical downlink shared channel (PDSCH), and a data channel used for uplink data transmission is a physical uplink shared channel (PUSCH). It should be noted that some control channels in a wireless network can not only transmit control information but also transmit data. Optionally, these control channels may also be considered as data channels. In addition, a data channel may have different names in different wireless networks, and for example, may be referred to as a data channel, a data tunnel, a data carrier, and a data connection. Moreover, in one wireless network, there may be a plurality of data channels used for uplink data transmission or downlink data transmission. Relatively, transmission of control information by using a control channel is referred to as control information transmission.

In this disclosure, symbols in a time domain are referred to as time domain symbols, and are referred to as symbols for short sometimes. Generally, based on different usage, the time domain symbols may be classified into time domain symbols used for data transmission and time domain symbols used for control information transmission. Based on different access technologies, the time domain symbols may alternatively be classified into time domain symbols corresponding to different access technologies, for example, orthogonal frequency division multiplexing (OFDM) symbols and single carrier frequency division multiple access (SC-FDMA) symbols. The time domain symbols may be different in different wireless networks. In a same wireless network, there may be different time domain symbols. For example, in an LTE network, a time domain symbol used in downlink transmission is an OFDM symbol, and a time domain symbol used in uplink transmission is an SC-FDMA symbol.

Scheduling used in this disclosure means allocating uplink resources or downlink resources to a terminal, so that the terminal performs data transmission based on the allocated radio resources. A scheduling period is a range of radio resources used in scheduling once in a time domain. For example, in an LTE network, in a TTI scheduling mode, the scheduling period is one TTI, and in a shorter TTI scheduling mode, the scheduling period is less than one TTI. For example, the scheduling period may be one slot or one symbol. Specific examples of the scheduling period in this disclosure do not constitute a limitation on the scheduling period, and a person skilled in the art should know that the technologies provided in this disclosure may be applied to scheduling periods of different time lengths.

In this disclosure, a person skilled in the art may understand that data transmission based on a time domain symbol means data transmission in a time range of the time domain symbol.

To more clearly describe the technical solutions in the embodiments of the present disclosure, the embodiments of the present disclosure are described by using an LTE network as an example. In an LTE network, an evolved UMTS terrestrial radio access (E-UTRA) network serves as a radio access network, and an evolved packet core (EPC) network serves as a core network. It should be noted that a network architecture and a service scenario described in the embodiments of the present disclosure are for the purpose of more clearly describing the technical solutions in the embodiments of the present disclosure, but do not constitute a limitation on the technical solutions provided in the embodiments of the present disclosure. A person of ordinary skill in the art may know that, as network architectures evolve and new service scenarios emerge, the technical solutions provided in the embodiments of the present disclosure are also applicable to similar technical problems.

Figure 2:
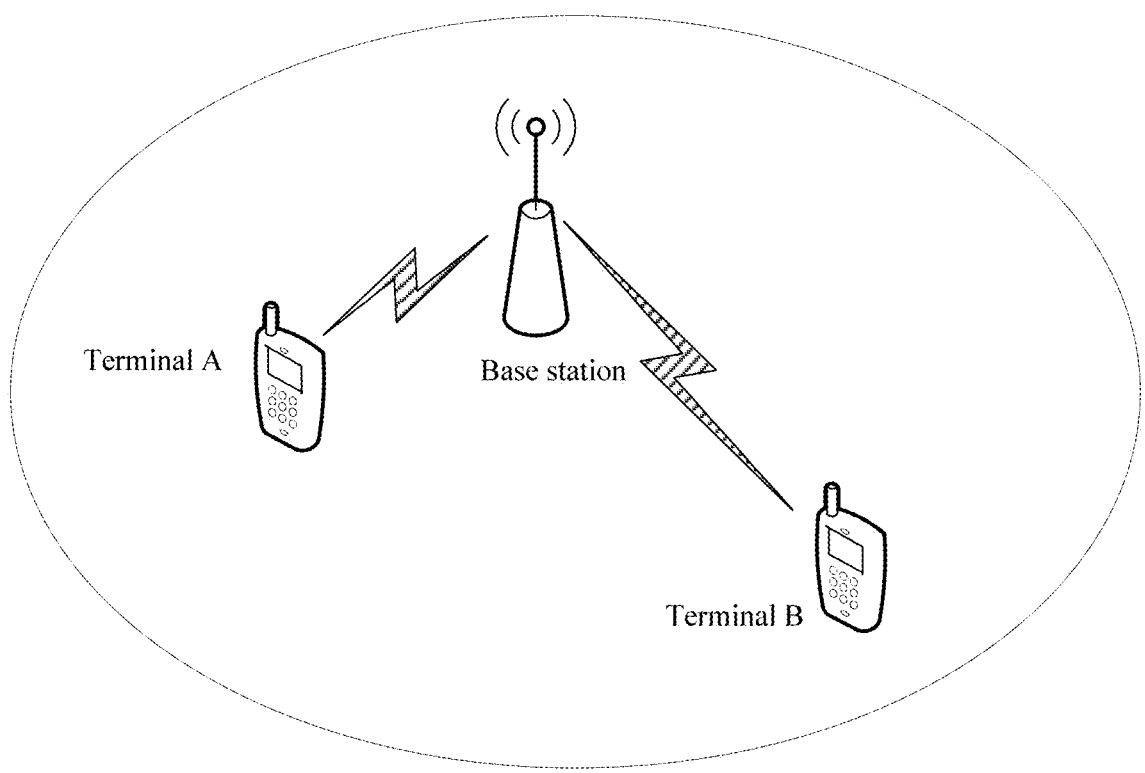
FIG. 2 is a schematic diagram of an disclosure scenario of an LTE network according to an embodiment of the present disclosure.

FIG. 2 describes an example in which a radio access network is an LTE network. In this scenario, a terminal A, a terminal B, and a base station are included. The terminal A supports a TTI scheduling mode, and therefore, a scheduling period of the terminal A is one TTI. The terminal B supports a shorter TTI scheduling mode, and it is assumed that a scheduling period of the terminal B is one symbol. A value of the scheduling period in the technical solutions of this disclosure is not limited. For example, the scheduling period may be two TTIs or two seconds or the like. For ease of description, the following embodiments describe examples in which the scheduling period is one TTI and the scheduling period is one symbol.

Figure 3:
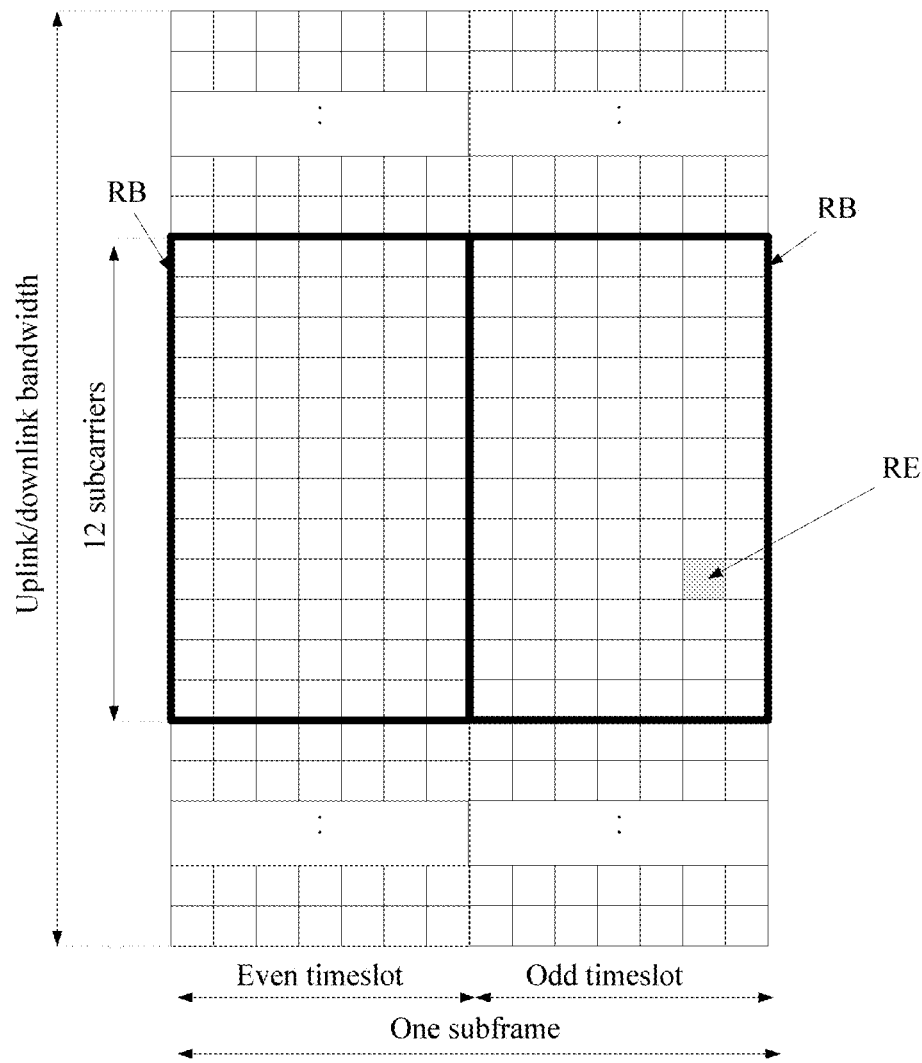
FIG. 3 is a schematic diagram of time-frequency resources of an LTE network according to an embodiment of the present disclosure.

In an LTE network, radio resources are usually represented in a form of a schematic diagram of time-frequency resources. As shown in FIG. 3, a longitudinal axis represents a frequency domain, and a horizontal axis represents a time domain. Each grid in the frequency domain represents one subcarrier, each grid in the time domain represents one symbol, and a grid including one subcarrier and one symbol represents a resource element (RE). The resource element may also be referred to as a resource particle or a resource unit. Generally, one resource block (RB) includes 12 consecutive subcarriers in the frequency domain, and includes seven consecutive symbols in the time domain. Therefore, one RB includes 84 REs. One subframe includes an even-numbered timeslot and an odd-numbered timeslot. One RB occupies one timeslot. Two RBs form an RB pair, and an RB pair occupies one subframe in the time domain, to be specific, occupies one TTI. Two RBs may occupy a same frequency domain range, or occupy different frequency domain ranges. For a TTI scheduling mode, the base station determines a frequency domain resource allocated to a terminal in uplink/downlink bandwidth by using an RB as a smallest allocation unit in the frequency domain. In the time domain, a resource allocated each time occupies one subframe, to be specific, one TTI. For a shorter TTI scheduling mode, the base station determines a frequency domain resource allocated to a terminal in uplink/downlink bandwidth by using an RB as a smallest allocation unit in the frequency domain. In the time domain, the resource allocated each time occupies less than one TTI.

Figure 4A:
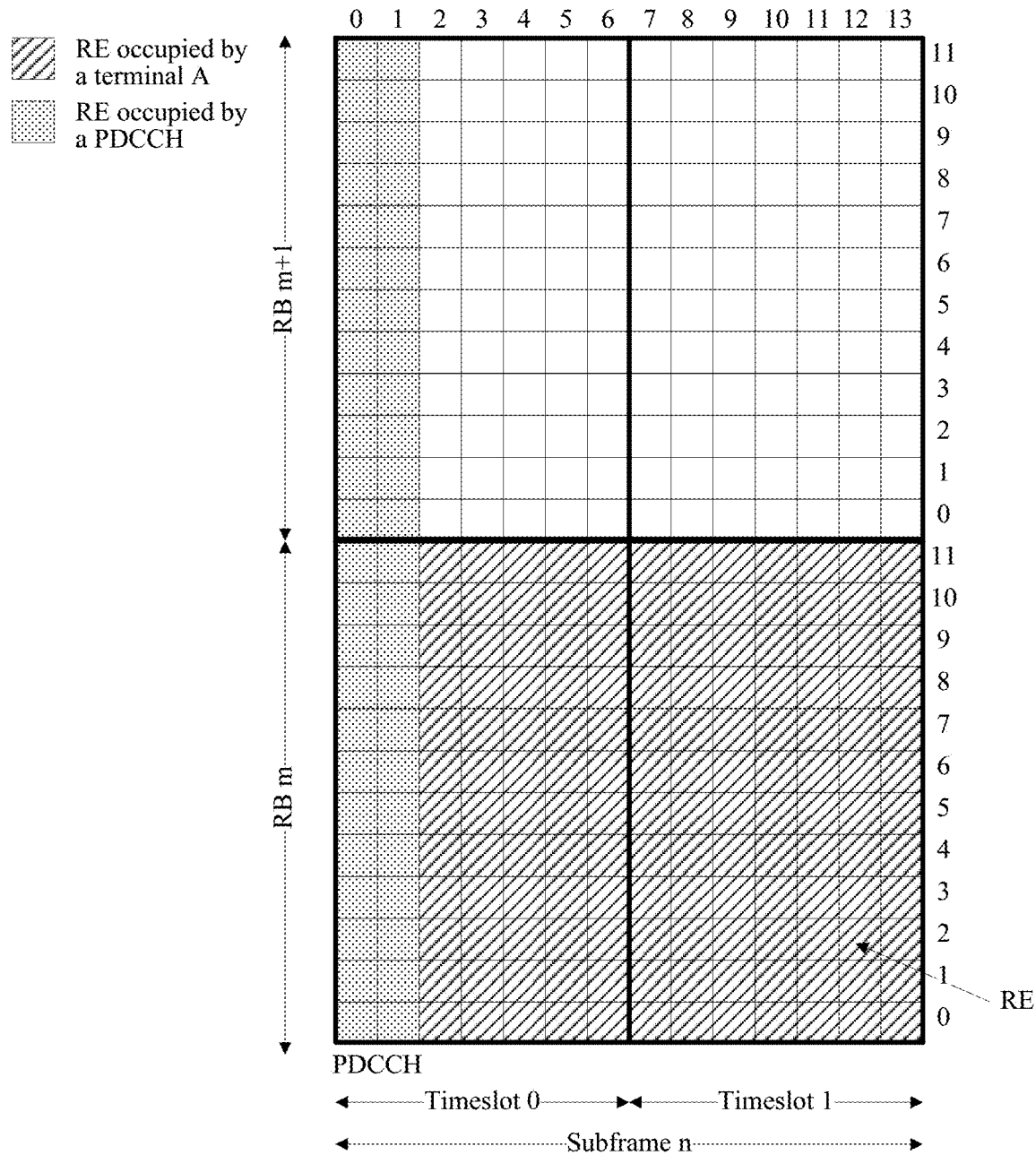
FIG. 4a is a schematic diagram of time-frequency resources for downlink transmission allocated to a terminal according to an embodiment of the present disclosure.

Based on the scenario in FIG. 2, FIG. 4a is a schematic diagram of time-frequency resources for downlink transmission allocated by the base station to the terminal A. For ease of description, in the frequency domain, different RBs are used to represent different frequency domain ranges. FIG. 4a includes two different frequency domain ranges; one is an RB m and the other is an RB m+1. Actually, each time the base station allocates time-frequency resources to the terminal A, the base station may allocate a plurality of RBs in the frequency domain. For ease of description, in FIG. 4a, a description is provided merely by using an example in which the terminal A allocates one RB in the frequency domain. Because the scheduling period of the terminal A is one TTI, to be specific, one subframe, each time the base station allocates a time-frequency resource to the terminal A, a length of the allocated time-frequency resource is one subframe in the time domain. 0 to 13 on the horizontal axis represent 14 symbols in a time domain of a subframe n, and 0 to 11 on the longitudinal axis represent 12 subcarriers in a frequency domain of an RB m or an RB m+1. As shown in FIG. 4a, the symbol 0 and the symbol 1 are occupied by a physical downlink control channel (PDCCH), and the PDCCH is mainly used to transmit control information. In some scenarios, the PDCCH may alternatively occupy the symbols 0-3. In FIG. 4a, the symbols 2-13 are used for data transmission, and are referred to as time domain symbols used for data transmission. In FIG. 4a, the base station allocates the RB m to the terminal A. Because the scheduling period of the terminal A is one TTI, the terminal A occupies all symbols that are used for data transmission and that are in the entire subframe in the time domain, for data transmission. To be specific, all the symbols are symbols 2-13. Therefore, the terminal A occupies REs in slashes on the right of FIG. 4a for data transmission.

Figure 4B:
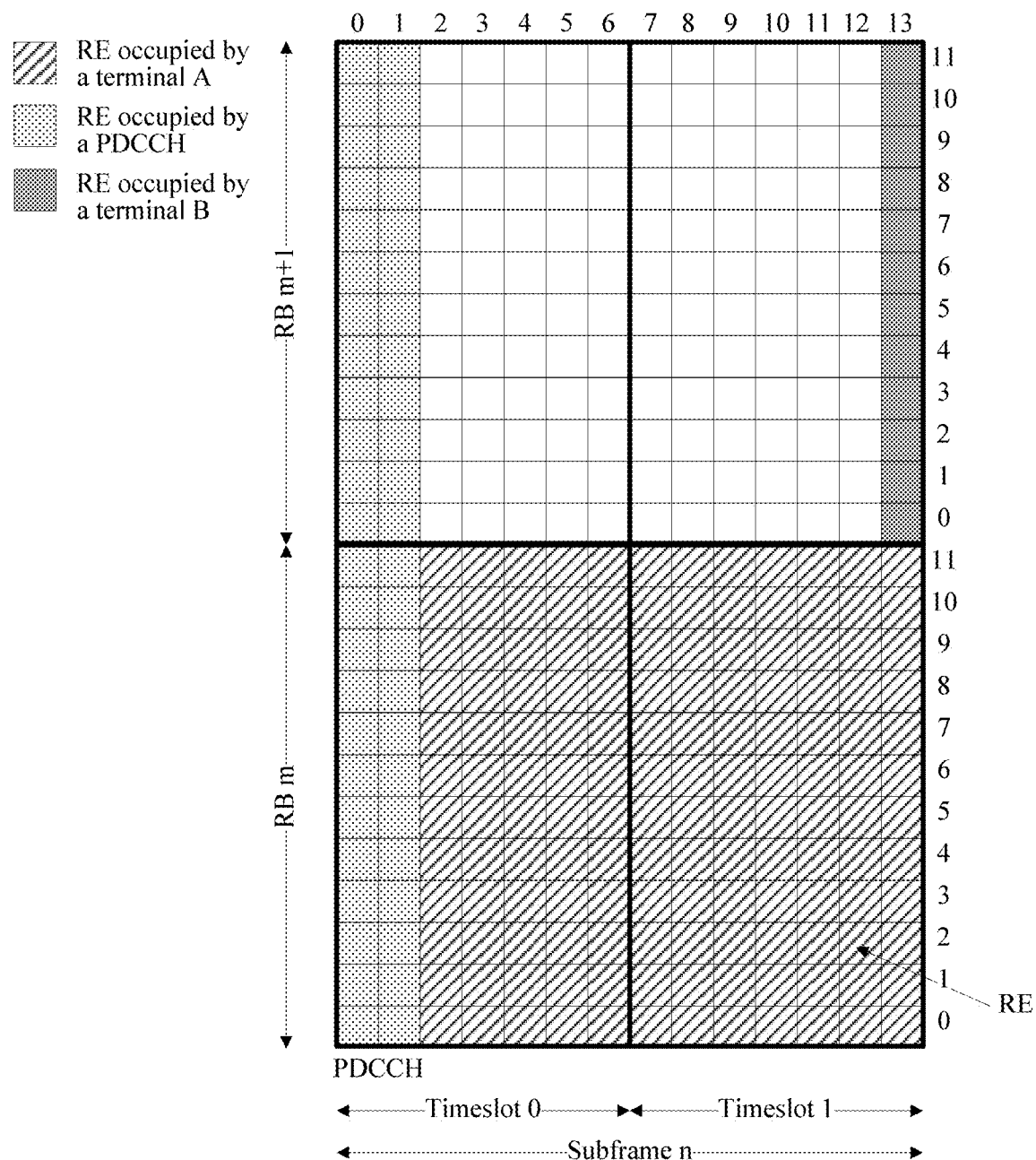
FIG. 4b is another schematic diagram of time-frequency resources for downlink transmission allocated to a terminal according to an embodiment of the present disclosure.

The scheduling period of the terminal B is one symbol, so that a length of a time-frequency resource allocated each time is one symbol in the time domain. In the frequency domain, a plurality of RBs may be allocated to the terminal B. To properly use the resources in the frequency domain in FIG. 4a, it may be considered that the time-frequency resource is allocated to the terminal B in a same subframe. As shown in FIG. 4b, the RB m+1 is allocated to the terminal B in the frequency domain, and the symbol 13 is allocated to the terminal B in the time domain. Therefore, the terminal B occupies gray REs in FIG. 4b for data transmission.

Figure 4C:
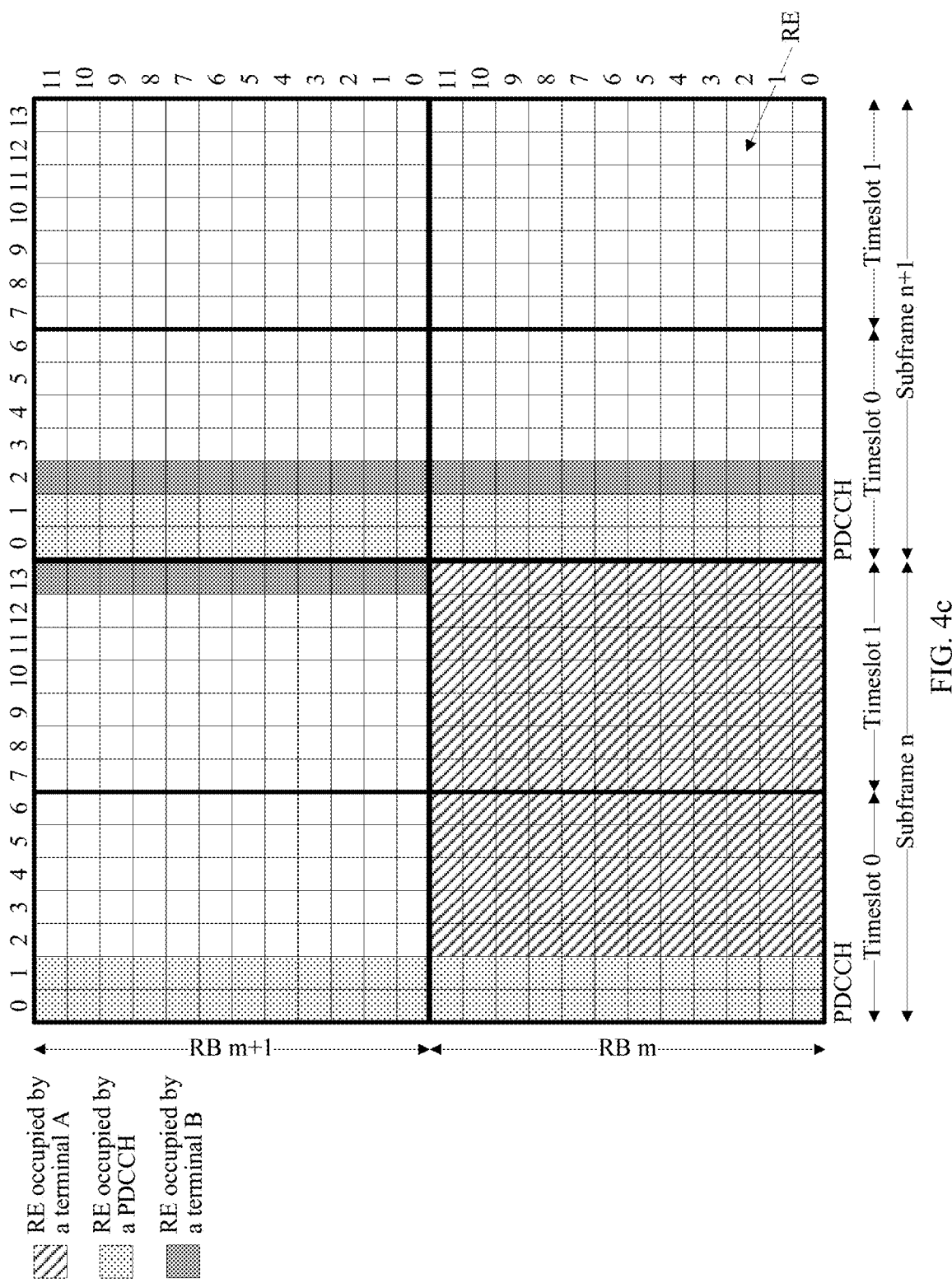
FIG. 4c is still another schematic diagram of time-frequency resources for downlink transmission allocated to a terminal according to an embodiment of the present disclosure.

Assuming that transmission requirements for low delays and high bandwidth of the terminal B are preferentially considered, all remaining data needs to be sent, to the terminal B, in the first symbol that is used for data transmission and that is in a subframe n+1 (for example, all the remaining data needs to occupy 24 REs). As shown in FIG. 4c, the base station allocates the symbol 2 in the subframe n+1 to the terminal B. In the case of FIG. 4c, the terminal B occupies all subcarriers of two RBs in the frequency domain in the symbol 2 in the subframe n+1, and consequently, the terminal A cannot perform data transmission in the subframe n+1. Because the scheduling period of the terminal A is one subframe, all symbols that are used for data transmission and that are in one subframe need to be occupied for transmission. To be specific, the symbols 2-13 in the subframe n+1 are occupied for data transmission.

Figure 4D:
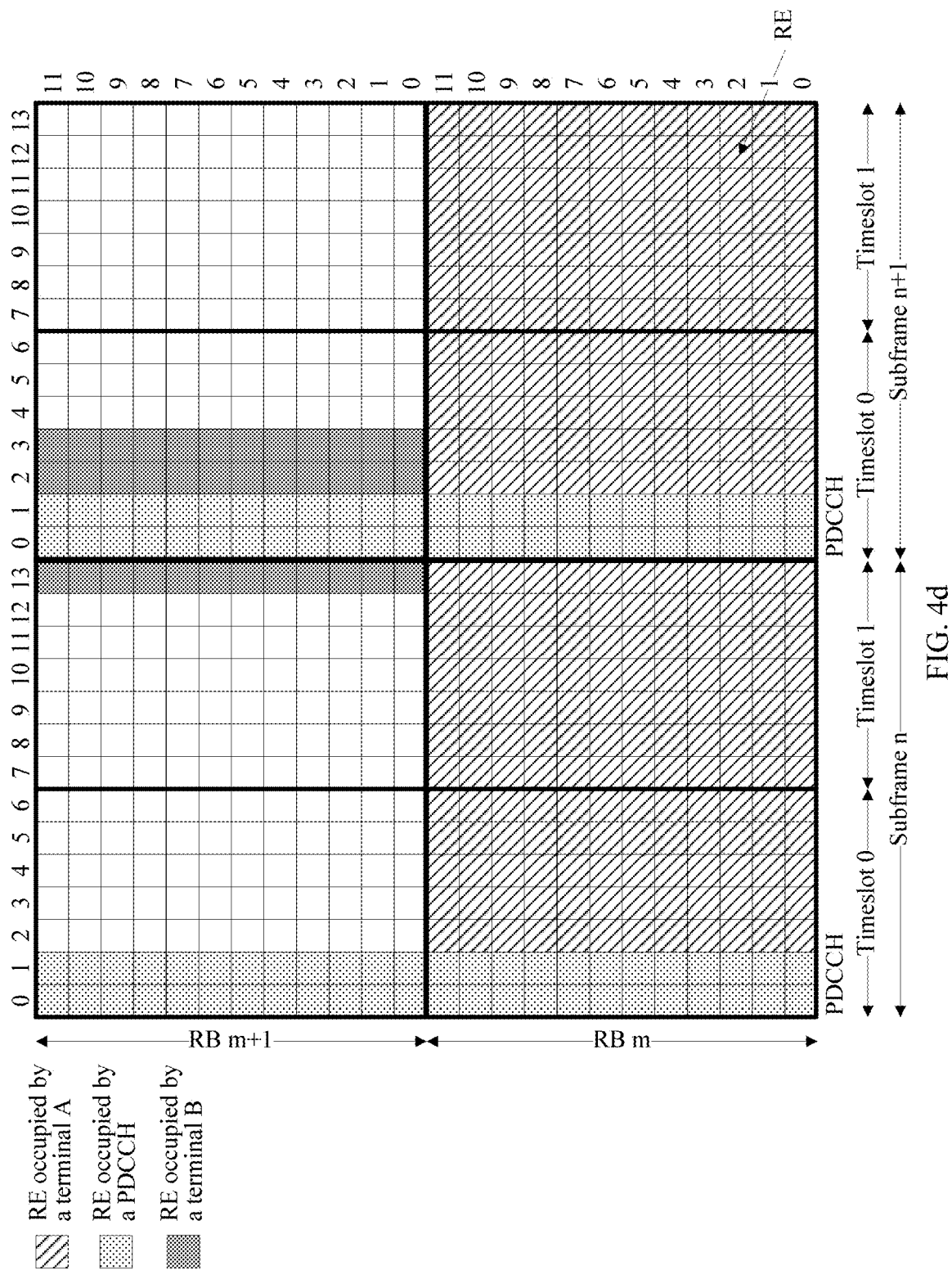
FIG. 4d is yet another schematic diagram of time-frequency resources for downlink transmission allocated to a terminal according to an embodiment of the present disclosure.

Assuming that requirements of the terminal A are preferentially considered, data of the terminal A is preferentially transmitted in a next subframe n+1. As shown in FIG. 4d, the terminal A continues to perform data transmission in the RB m in the frequency domain in the subframe n+1. To meet data transmission requirements of the terminal B as many as possible (for example, the terminal B further needs to transmit, in one symbol, data occupying 24 REs), the base station allocates the symbol 2 and the symbol 3 to the terminal B in the subframe n+1, and allocates the RB m+1 in the frequency domain. It can be learned that the terminal B completes data transmission after two symbols fastest. Consequently, data transmission of the terminal B cannot meet requirements on delays.

This disclosure provides a time domain symbol puncturing technology. In a scheduling period of a terminal, some of time domain symbols used for data transmission are selected for puncturing. The punctured time domain symbol may not be used by the terminal for data transmission, or may be allocated to another terminal for data transmission. In this way, the time domain symbols in this period can be flexibly allocated.

Specifically, an embodiment of the present disclosure provides a data transmission method, and a base station and a terminal based on the method. The base station sends time domain symbol configuration information to the terminal. The time domain symbol configuration information is used to indicate a time domain symbol allocated to the terminal, in time domain symbols that are used for data transmission and that are in a scheduling period of the terminal (the time domain symbol allocated to the terminal may be understood as a time domain symbol that is not punctured in the scheduling period, a time domain symbol not allocated to the terminal may be understood as a time domain symbol that is punctured in the scheduling period). After receiving the time domain symbol configuration information, the terminal performs data transmission in the time domain symbol indicated by the time domain symbol configuration information, to be specific, sends data and receives data. Because the terminal and the base station agree upon the allocated time domain symbol in the scheduling period, the terminal does not need to perform data transmission in all time domain symbols that are used for data transmission and that are in the scheduling period. The base station may perform data transmission with the terminal in the time domain symbol indicated to the terminal, to be specific, receive data sent by the terminal or send data to the terminal. When allocating the time domain symbol, the base station may allocate, to the terminal, some of time domain symbols that are used for data transmission and that are in the scheduling period. Therefore, in the scheduling period, radio resources can be flexibly allocated, thereby improving radio resource utilization. The base station provided in this embodiment of the present disclosure includes a function module, a chip, or a module configured to perform the functions of the base station in this method. The terminal provided in this embodiment of the present disclosure includes a function module, a chip, or a module configured to perform the functions of the terminal in this method.

Figure 5A:
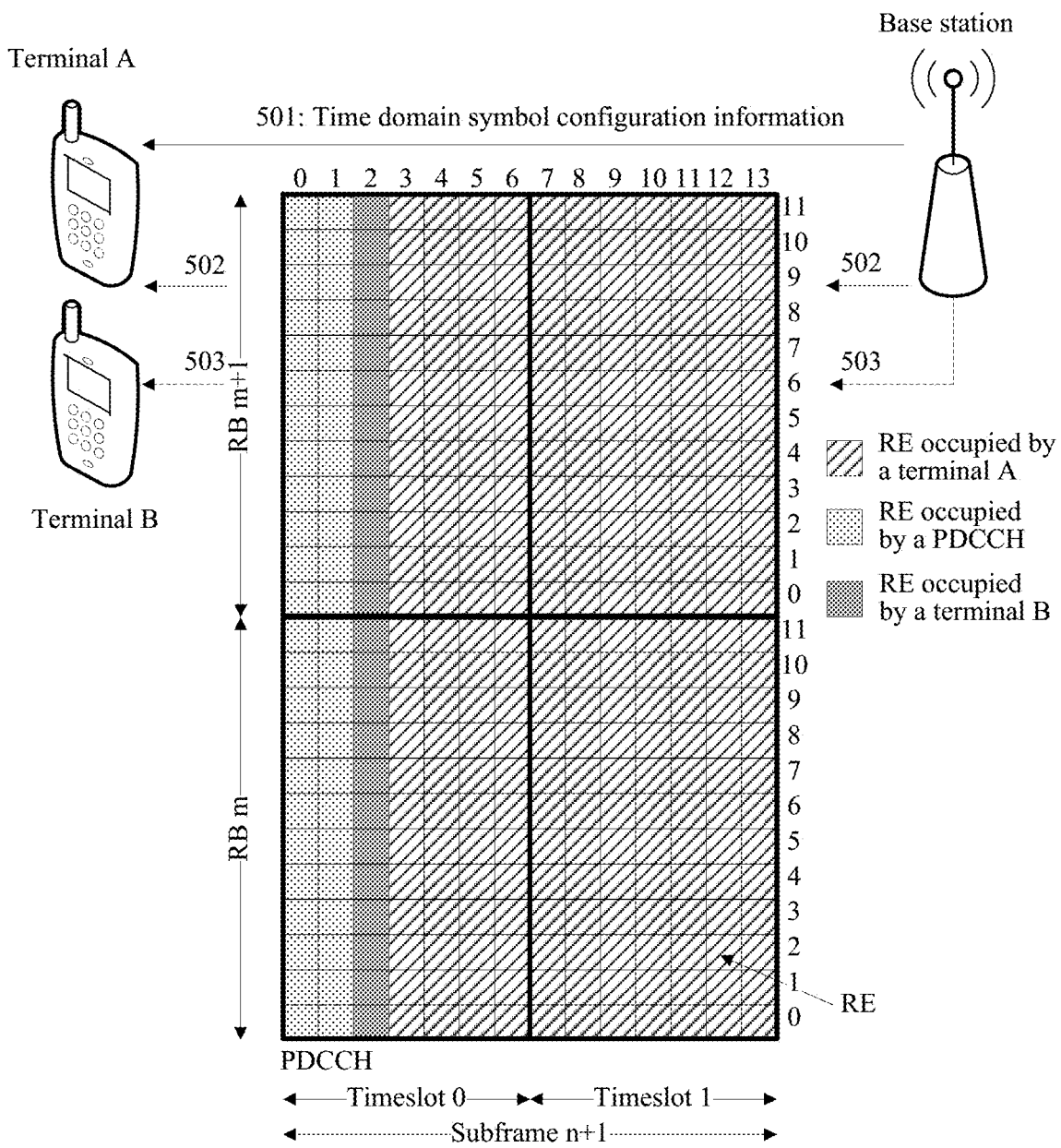
FIG. 5a is a schematic diagram of a data transmission method according to an embodiment of the present disclosure.

FIG. 5a is a schematic diagram of a data transmission method used in an LTE network according to an embodiment of the present disclosure. FIG. 5a describes allocation of the time-frequency resources in the subframe n+1 in FIG. 4c and FIG. 4d. FIG. 5a shows a downlink transmission scenario.

In a part 501, a base station sends time domain symbol configuration information to a terminal A.

Correspondingly, in the part 501, the terminal A receives the time domain symbol configuration information sent by the base station.

The time domain symbol configuration information is used to indicate that time domain symbols that are allocated to the terminal A in the subframe n+1 are 3-13. Therefore, the terminal A may know that the symbol 2 is not allocated to the terminal A.

In the LTE network, the base station may notify, by using downlink control information (DCI), that a frequency domain range allocated to the terminal A in the frequency domain is the RB m and the RB m+1.

In a part 502, the terminal A performs downlink data transmission in the symbols 3-13 in the subframe n+1 based on the time domain symbol configuration information, to be specific, the terminal A receives data from the base station in the symbols 3-13.

Correspondingly, in the part 502, the base station performs downlink data transmission with the terminal A in the symbols 3-13 based on the time domain symbol configuration information. To be specific, the base station sends data to the terminal A in the symbols 3-13.

According to the part 501 and the part 502, the terminal A may receive, in the symbols 3-13, the data sent by the base station. Not limited by a scheduling mode, the terminal A does not need to occupy all the symbols 2-13 used for data transmission to receive the data sent by the base station. Therefore, the base station may allocate, to the terminal A, the RB m and the RB m+1 in the frequency domain in the subframe n+1, so that the terminal A can fully use the time-frequency resources in the subframe n+1, a resource waste problem shown in FIG. 4c is avoided, and data transmission between the terminal A and the base station is more efficient and flexible, thereby improving radio resource utilization.

Optionally, the punctured symbol 2 may be allocated to the terminal B for data transmission, as shown in a part 503:

In the part 503, the terminal B receives, in the symbol 2, data sent by the base station.

Correspondingly, in the part 503, the base station sends the data to the terminal B in the symbol 2. The base station may schedule the terminal B by using an existing mechanism. For example, the base station adds control information to some subcarriers in the symbol 2 to indicate to the terminal B that the symbol 2 is allocated to the terminal B.

By occupying all 24 subcarriers in two RBs in the frequency domain in the symbol 2, the terminal B may receive the data sent by the base station, so that data transmission requirements of the terminal B are met, a data delay problem of the terminal B shown in FIG. 4d is avoided, thereby improving radio resource usage effectiveness.

Figure 5B:
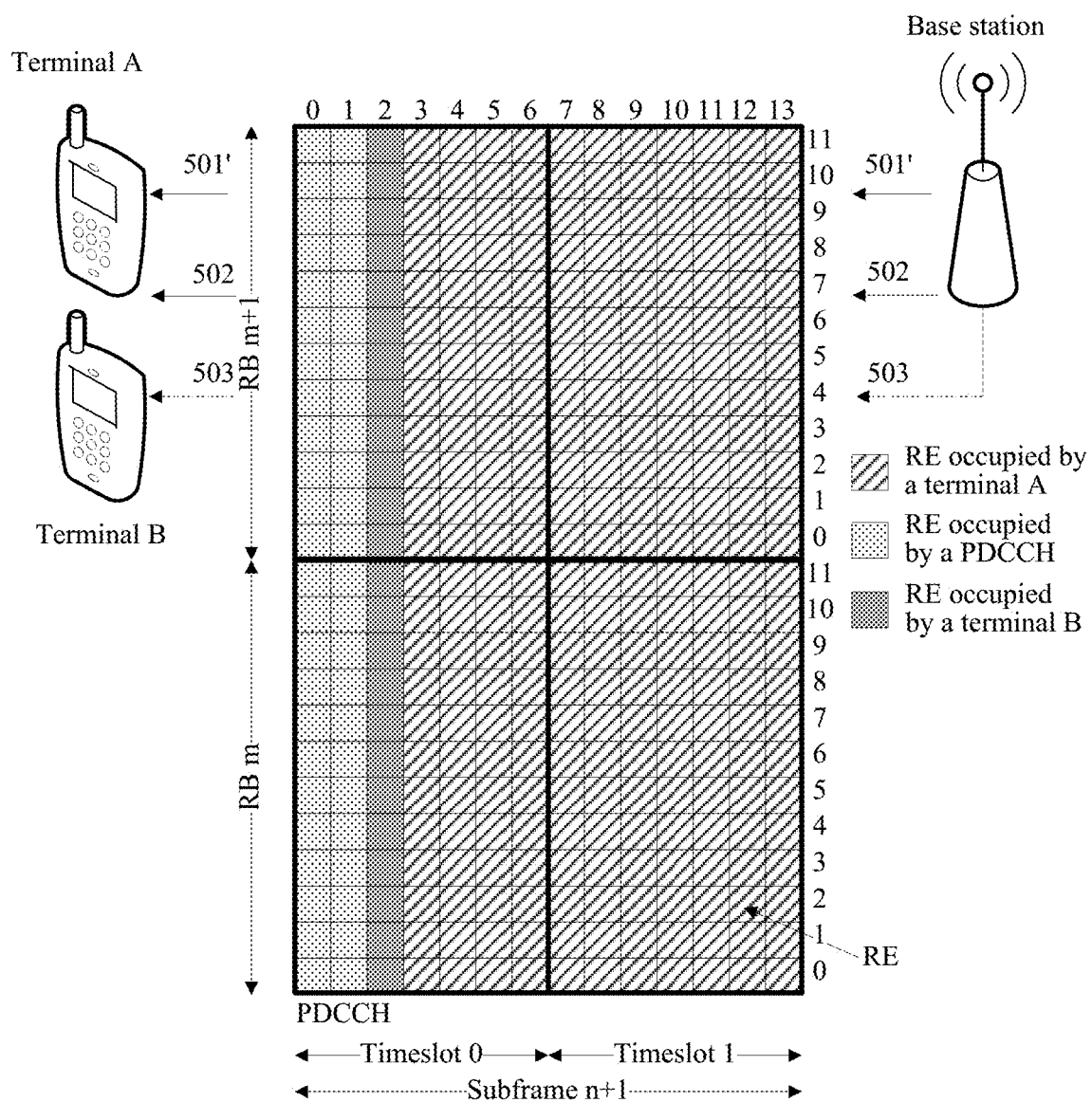
FIG. 5b is a schematic diagram of another data transmission method according to an embodiment of the present disclosure.

In an implementation of the part 501, the base station may add the time domain symbol configuration information to DCI and send the DCI to the terminal A. FIG. 5b is a further description of FIG. 5a. A part 501' is one of specific implementations of the part 501. As shown in FIG. 5b, in the part 501', the base station sends the DCI to the terminal A by using a PDCCH in the subframe n+1, to be specific, sends the DCI to the terminal in the symbols 0-1 in the subframe n+1. The DCI includes the time domain symbol configuration information. The base station may further notify, in the DCI, the RB m and the RB m+1 that are in the frequency domain and that are allocated to the terminal A in the subframe n+1. Therefore, in the part 502, the terminal A may determine, based on the DCI, that the time-frequency resource allocated in the subframe n+1 occupies the symbols 3-13 in the time domain and occupies the RB m and the RB m+1 in the frequency domain, and may receive data from the base station in the allocated time-frequency resource. According to the part 501', each time the base station schedules the terminal A, the base station can dynamically allocate symbols in a subframe in a very flexible manner.

Figure 5C:
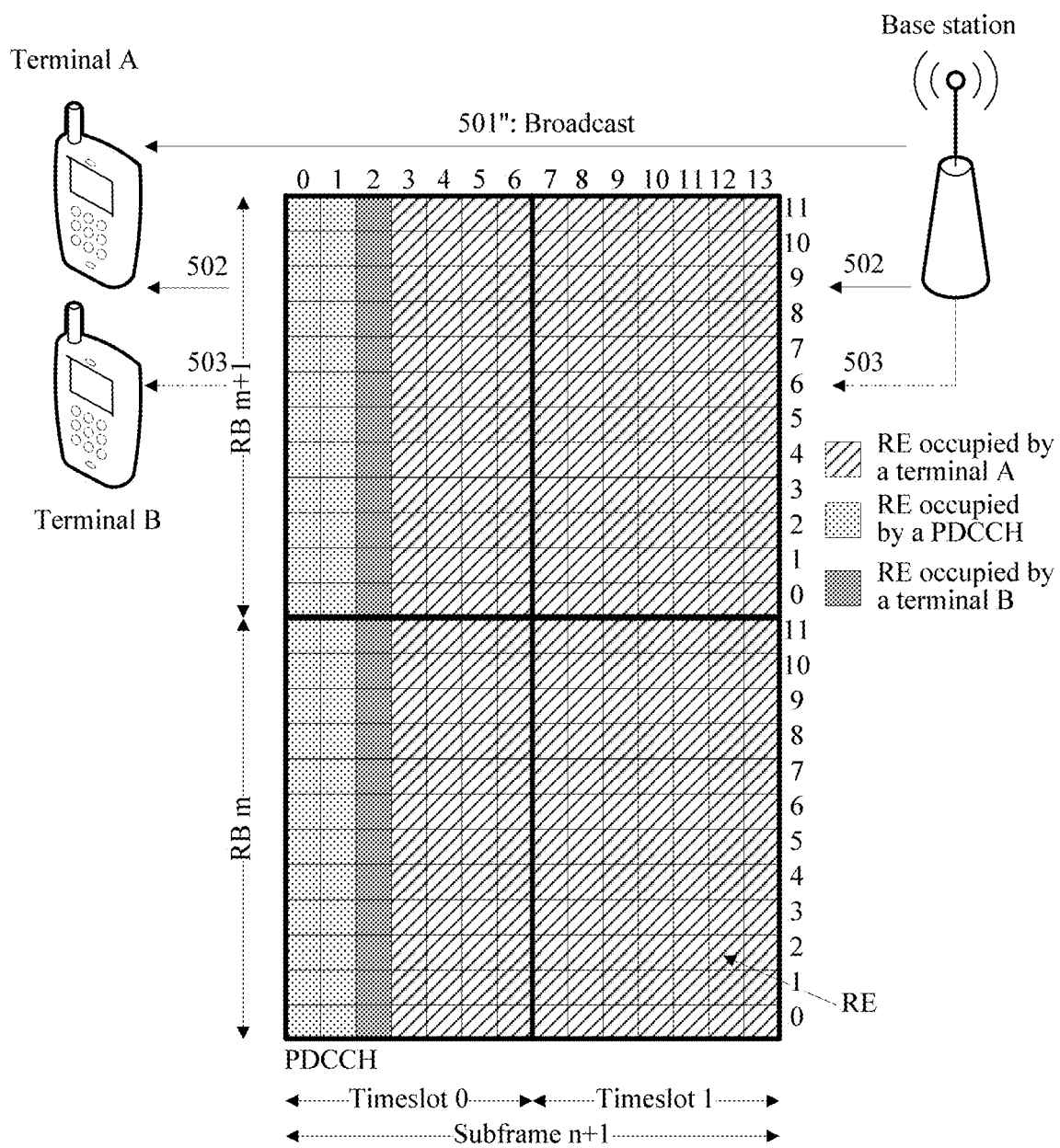
FIG. 5c is a schematic diagram of still another data transmission method according to an embodiment of the present disclosure.

In another implementation of the part 501, the base station may add the time domain symbol configuration information to a signaling message that is sent to the terminal. For example, the signaling message may include a broadcast message and a Radio Resource Control (RRC) message. FIG. 5c is a further description of FIG. 5a. A part 501" is one of specific implementations of the part 501. As shown in FIG. 5c, in the part 501", the base station sends the time domain symbol configuration information to the terminal A in a broadcast manner. When the base station needs to schedule the terminal A in the subframe n+1, the base station may send DCI to the terminal A by using a PDCCH in the subframe n+1. The DCI is used to notify the terminal A of the RB m and the RB m+1 that are in the frequency domain and that are allocated to the terminal A in the subframe n+1. Therefore, in the part 502, the terminal A may determine, based on the DCI and the time domain symbol configuration information received previously, that the time-frequency resource allocated in the subframe n+1 occupies the symbols 3-13 in the time domain and occupies the RB m and the RB m+1 in the frequency domain, and may receive the data from the base station in the allocated time-frequency resource. According to the part 501", the base station may update the time domain symbol configuration information of the terminal A when the time domain symbol configuration information needs to be changed, so that semi-static allocation of time domain symbols can be implemented, thereby reducing signaling overheads.

Optionally, when the terminal A is initially configured, for example, when the terminal A is at delivery or initially accesses a network, the terminal A preconfigures the time domain symbol configuration information. In this way, the base station may not need to send the time domain symbol configuration information to the terminal A. When the base station schedules the terminal A in the subframe n+1, the base station sends data to the terminal A in the symbols 3-13 based on the time domain symbol configuration information preconfigured on the base station, and the terminal A receives, in the symbols 3-13 based on the time domain symbol configuration information preconfigured on the terminal A, the data sent by the base station. Therefore, in this case, the part 501 is optional.

In an optional implementation, the time domain symbol configuration information may be represented by a plurality of bits. In an implementation, 12 bits such as "011111111111" may be used to respectively represent time domain symbols 3-13 that are used for data transmission and that are in the subframe n+1. "111111111111" represents that the symbols 3-13 are allocated to the terminal A, and "o" represents that the symbol 2 is not allocated to the terminal A. In another implementation, the time domain symbol configuration information may be an index of time domain symbols that are allocated to the terminal A in the subframe n+1, for example, "3-13". In another implementation, the time domain symbol configuration information may be an index of a time domain symbol not allocated to the terminal A, for example, "2". In this case, the terminal A may determine that the symbols 3-13 are the time domain symbols allocated to the terminal A. In another implementation, the time domain symbol configuration information may be an index of time domain symbols that are allocated to the terminal A in a timeslot 0 in the subframe n+1, for example, "4-6". In this case, the terminal A may determine, based on a particular mapping relationship such as a symmetric mapping relationship, that the symbols 11-13 in the timeslot 1 are also the time domain symbols allocated to the terminal A. Therefore, the terminal A may determine, based on the time domain information, that the time domain symbols "4-6 and 11-13" are symbols that are allocated to the terminal A in the subframe n+1. In another implementation, different time domain configuration solutions may be separately preconfigured on the base station and the terminal A. For example, in a configuration 1, the symbols 2-10 are allocated, in a configuration 2, the symbols 3-5 are reserved, and in a configuration 3, the first symbol in the first timeslot is reserved. In this case, the time domain symbol configuration information may be a time domain symbol configuration identifier, and the identifier is used to identify one of the preconfigured configurations 1-3.

In FIG. 5a, FIG. 5b, and FIG. 5c, the base station may further send a reference signal, for example, a cell-specific reference signal (CRS, where a cell-specific reference signal may also be referred to as a cell reference signal), a channel state information reference signal (CSI-RS) or a user equipment-specific reference signal (UE-specific RS). The foregoing reference signals are distributed in different time domain symbols in the subframe n+1 based on different configurations. In an optional implementation, if the base station sends a reference signal in the symbol 2 that is in the subframe n+1 and that is not allocated to the terminal A, the terminal A can still receive, in the symbol 2, the reference signal sent by the base station. Similarly, if the base station sends a reference signal in a time domain symbol that is in the subframe n+1 and that is allocated to the terminal A, the terminal A can receive, in this symbol, the reference signal sent by the base station. Based on the processing on the reference signal, data transmission quality of the terminal A can be ensured.

In an optional implementation, the base station may determine, based on transmission requirements of the terminal A, a quantity of symbols that are allocated to the terminal A in the subframe n+1. For example, the terminal A needs 72 REs to transmit data, and if the terminal A may occupy two RBs in the frequency domain, the base station may determine to allocate three symbols to the terminal A. In another implementation, the base station may determine, based on transmission requirements of the terminal B, a quantity of symbols that are allocated to the terminal A in the subframe n+1. For example, the terminal B needs 48 REs to transmit data, and if the terminals A and B may occupy two RBs in the frequency domain, the base station may allocate two symbols in the subframe n+1 to the terminal B, and allocate the other 10 symbols to the terminal A. Similarly, the base station may determine, based on transmission requirements of the terminal B, a quantity of symbols that are allocated to the terminal B in the subframe n+1, or determine, based on transmission requirements of the terminal A, a quantity of symbols that are allocated to the terminal B in the subframe n+1.

In an optional implementation, the quantity of symbols that are allocated to the terminal A in the subframe n+1 may be used to determine a transport block size (TBS) of the terminal A in the subframe n+1. To be specific, the quantity of symbols that are allocated to the terminal A in the subframe n+1 is one of parameters for determining the TBS of the terminal A in the subframe n+1. Similarly, the quantity of symbols that are allocated to the terminal B in the subframe n+1 is one of parameters for determining a TBS of the terminal B in the subframe n+1.

In an optional implementation, it can be learned from FIG. 5a, FIG. 5b, and FIG. 5c that, in a downlink transmission scenario, time domain symbols that may be allocated to the terminal A and the terminal B are the symbols 2-13, which are time domain symbols that are used for data transmission and that are in the subframe n+1. In other words, the time domain symbols allocated to the terminal do not include a symbol occupied by a PDCCH.

Figure 6:
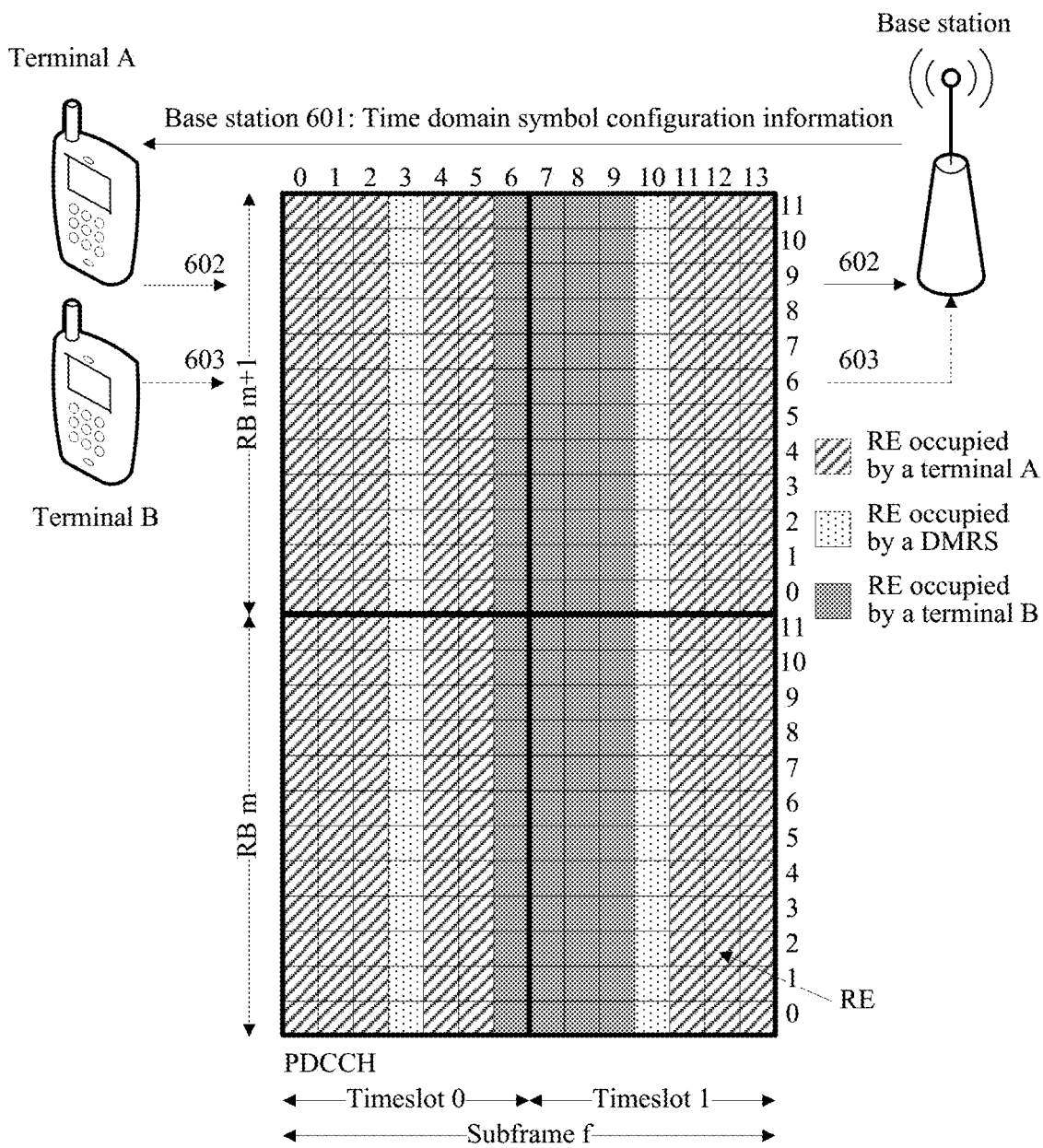
FIG. 6 is a schematic diagram of yet another data transmission method according to an embodiment of the present disclosure.

A data transmission method provided in an embodiment of the present disclosure can also be applied to an uplink scenario. FIG. 6 is a schematic diagram of another data transmission method used in an LTE network according to this embodiment of the present disclosure. FIG. 6 shows an uplink transmission scenario.

Different from a subframe used for downlink transmission, in a subframe used for uplink transmission, the symbol 3 and the symbol 10 are occupied by a demodulation reference signal (DMRS), and the DMRS is a reference signal sent by a terminal to a base station. The symbols 0-2, 4-9, and 11-13 are used for uplink data transmission, and may be allocated to the terminal.

In a part 601, a base station sends time domain symbol configuration information to a terminal A.

The time domain symbol configuration information is used to indicate that time domain symbols allocated to the terminal A in a subframe f are 0-2, 4, 5, and 11-13. Therefore, the terminal A can learn that the symbols 6-9 are not allocated to the terminal A.

Same as the downlink transmission, the base station may notify, by using downlink control information (DCI), that a frequency domain range allocated to the terminal A in a frequency domain is an RB m and an RB m+1.

In a part 602, the terminal A performs uplink data transmission based on the time domain symbol configuration information in the symbols 0-2, 4, 5, and 11-13 in a subframe f, to be specific, the terminal A sends data to the base station in the symbols 0-2, 4, 5, and 11-13.

According to the part 601 and the part 602, the terminal A may send data in the symbols 0-2, 4, 5, and 11-13. Not limited by a scheduling mode, the terminal A does not need to occupy all the symbols 0-2, 4-9, and 11-13 used for data transmission to send data. The terminal A can fully use time-frequency resources in the subframe f, so that a resource waste problem similar to that shown in FIG. 4c is avoided, and data transmission between the terminal A and the base station is more efficient and flexible, thereby improving radio resource utilization.

Optionally, the punctured symbols 6-9 may be allocated to a terminal B for uplink data transmission. As shown in a part 603:

In the part 603, a terminal B sends data to the base station in the symbols 6-9.

The base station may schedule the terminal B by using an existing mechanism. For example, the base station adds control information to some subcarriers in the symbols 6-9 to indicate to the terminal B that the symbols 6-9 are allocated to the terminal B.

By occupying all 24 subcarriers in two RBs in the frequency domain in the symbols 6-9, the terminal B may send the data to the base station, so that data transmission requirements of the terminal B are met, and a data delay problem of the terminal B similar to that shown in FIG. 4d is avoided, thereby improving radio resource usage effectiveness.

In an optional implementation, similar to the part 501, in the part 601, the base station may add the time domain symbol configuration information in DCI, and send the DCI to the terminal A. For details, refer to the description of the part 501.

It should be noted that, in the uplink transmission scenario, the base station send DCI to the terminal in a subframe different from a subframe in which the terminal sends uplink data to the base station. In an FDD scenario, if the base station sends DCI to the terminal in a subframe x, the terminal sends data to the base station in a subframe x+4. In a TDD scenario, if the base station sends DCI to the terminal in a subframe y, the terminal sends data to the base station in a subframe y+k, where k=4, 5, 6, or 7. A person skilled in the art should be noted that, a value of k depends on uplink and downlink configurations and a subframe number. The value may be as shown in Table 1.

TABLE 1

| TDD uplink and downlink configurations | Value of k |  |  |  |  |  |  |  |  |  |
|---|---|---|---|---|---|---|---|---|---|---|
| | Subframe number n |  |  |  |  |  |  |  |  |  |
| | 0 | 1 | 2 | 3 | 4 | 5 | 6 | 7 | 8 | 9 |
| 0 | 4 | 6 |  |  |  | 4 | 6 |  |  |  |
| 1 |  | 6 |  |  | 4 |  | 6 |  |  | 4 |
| 2 |  |  |  | 4 |  |  |  |  | 4 |  |
| 3 | 4 |  |  |  |  |  |  | 4 | 4 | 4 |
| 4 |  |  |  |  |  |  |  | 4 | 4 |  |
| 5 |  |  |  |  |  |  |  |  | 4 |  |
| 6 | 7 | 7 |  |  |  | 7 | 7 |  |  | 5 |

Similar to the part 501, in the part 601, the base station may add the time domain symbol configuration information to a signaling message sent to the terminal. For details, refer to the description of the part 501.

In an optional implementation, similar to a downlink transmission scenario, the time domain symbol configuration information may alternatively be preconfigured in the terminal, to be specific, preconfigured in the terminal at delivery of the terminal.

In an optional implementation, for a specific implementation of the time domain symbol configuration information, determining of a quantity of symbols allocated to the terminal, and determining of a TBS of the terminal, refer to the related descriptions of FIG. 5a, FIG. 5b, and FIG. 5c.

In an implementation, in the uplink transmission scenario, time domain symbols that may be allocated to the terminal A and the terminal B do not include a symbol used to transmit a DMRS. In this way, the symbol for the DMRS is not allocated to the terminal B, and the terminal A may send the DMRS to the base station by using the symbol occupied by the DMRS, thereby facilitating correct demodulation of uplink data or channel estimation by the base station.

The foregoing embodiments are described by using an example in which there are two different scheduling periods in a network. A person skilled in the art may understand that, the technical solution of this disclosure may also be applicable to cases in which there are three or more different scheduling periods.

In the foregoing embodiments, to save radio resources as many as possible, all symbols that are not allocated to the terminal A are allocated to the terminal B. Actually, some of symbols that are not allocated to the terminal A may be selected and allocated to the terminal B based on an actual transmission requirement.

In the foregoing embodiments, the terminal A and the terminal B have different scheduling periods. A person skilled in the art may understand that, the technical solution in this disclosure may be applied to a wireless network in which there is only one type of scheduling period, and resource allocation can also be optimized.

The solution provided in the embodiments of the present disclosure is described above mainly from the perspective of interaction among all network elements. It may understand that to implement the foregoing functions, each network element such as a terminal or a base station, includes a corresponding hardware structure and/or software module for performing each function. A person skilled in the art may be easily aware that, in combination with examples of units and algorithm steps described in the embodiments disclosed in this specification, the present disclosure may be implemented by hardware or a combination of hardware and computer software. Whether the functions are performed in the form of hardware or computer software-driven hardware depends on the particular disclosure of the technical solutions and the constraint conditions of the design. A person skilled in the art can use different methods to implement the described functions for each particular disclosure, but it should not be considered that the implementation goes beyond the scope of the embodiments of the present disclosure.

Figure 7:
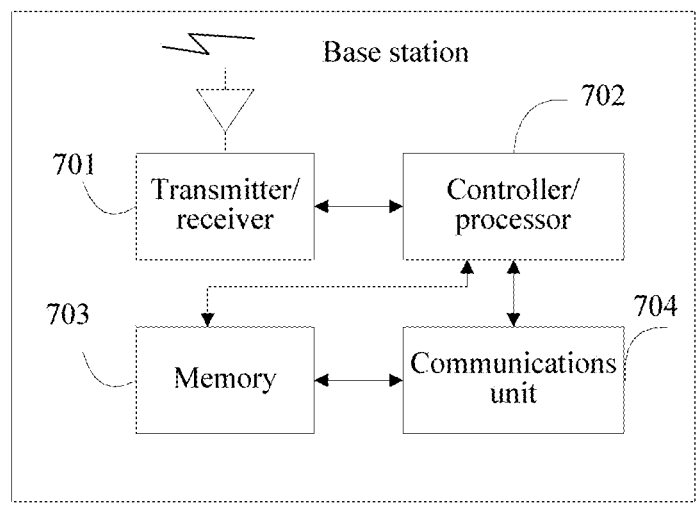
FIG. 7 is a schematic architectural diagram of a base station according to an embodiment of the present disclosure.

To implement the methods shown in FIG. 5a, FIG. 5b, FIG. 5c, and FIG. 6, the embodiments of the present disclosure provide a base station and a terminal. FIG. 7 is a possible schematic structural diagram of a base station according to an embodiment of the present disclosure. The base station may be the base station used in FIG. 5a, FIG. 5b, FIG. 5c, and FIG. 6.

As shown in FIG. 7, the base station includes a transmitter/receiver 701, a controller/processor 702, a memory 703, and a communications unit 704. The transmitter/receiver 701 is configured to support uplink and downlink transmission 7 between the base station and the terminal. The controller/processor 702 performs various functions for communication with the terminal. During uplink transmission, an uplink transmission signal from the terminal is received by an antenna, demodulated by the receiver 701, and further processed by the controller/processor 702 to recover data and control information that are sent by the terminal. During downlink transmission, the data and the control information are processed by the controller/processor 702, demodulated by the transmitter 701 to generate a downlink transmission signal, and transmitted to the terminal by using the antenna. The controller/processor 702 is further configured to perform the processing processes related to the base station in the data transmission method provided in the embodiments of the present disclosure, for example, in FIG. 5a, FIG. 5b, FIG. 5c, and FIG. 6, and/or configured to perform other processes of technologies described in this disclosure. For example, the controller/processor 702 may control the transmitter/receiver 701 to perform data transmission with the terminal based on time domain symbols allocated to the terminal. The memory 703 is configured to store program code and data of the base station. The communications unit 704 is configured to support the base station to communicate with another network entity. For example, the communications unit 704 is configured to support the base station to communicate with a core network shown in FIG. 1, for example, to communicate with a mobility management entity (MME) or a serving gateway (SGW) in the core network.

In an implementation, a transceiver may integrate functions of a receiver and a transmitter. Therefore, the receiver/transmitter 701 in FIG. 7 may also be referred to as a transceiver 701.

It may understand that, FIG. 7 only shows a simplified design of the base station. In an actual disclosure, the base station may include any quantities of transmitters, receivers, processors, controllers, memories, communications units, and the like, and all base stations that can implement the present disclosure shall fall within the protection scope of the present disclosure.

Figure 8:
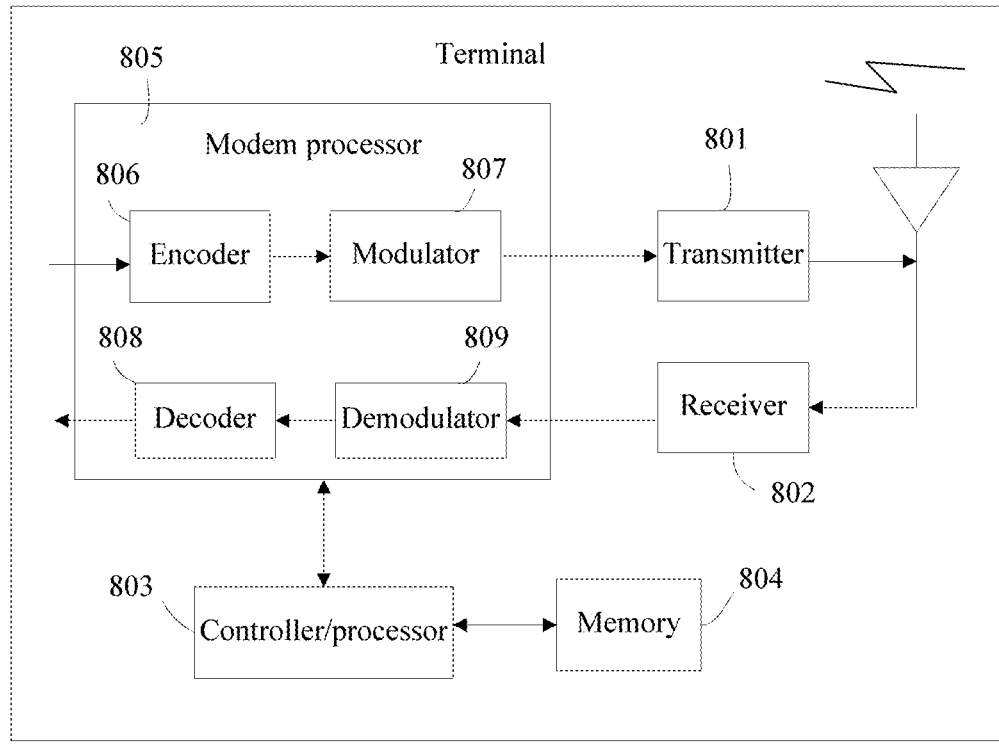
FIG. 8 is a schematic architectural diagram of a terminal according to an embodiment of the present disclosure.

FIG. 8 is a simplified schematic diagram of a possible design structure of a terminal according to an embodiment of the present disclosure. The terminal may be the terminal A used in FIG. 5a, 5b, 5c, and FIG. 6. The terminal includes a transmitter 801, a receiver 802, a controller/processor 803, a memory 804, and a modem processor 805.

The transmitter 801 adjusts (for example, performs analog conversion, filtering, amplification, or up-conversion on) an output sample and generates an uplink transmission signal. The uplink transmission signal is transmitted to the base station in the foregoing embodiments by using an antenna. During downlink transmission, the antenna receives a downlink transmission signal transmitted by the base station in the foregoing embodiments. The receiver 802 adjusts (for example, performs filtering, amplification, down-conversion, or digitization) the signal received from the antenna and provides an input sample. In the modem processor 805, an encoder 806 receives data and control information that are to be sent during uplink transmission, and performs processing (for example, formatting, encoding, or interleaving) on the data and the control information. A modulator 807 further performs processing (for example, symbol mapping and modulation) on encoded data and control message and provides an output sample. A demodulator 809 processes (for example, demodulates) the input sample and provides symbol estimation. A decoder 808 processes (for example, de-interleaves and decodes) the symbol estimation and provides decoded data and a decoded signaling message that are sent to the terminal. The encoder 806, the modulator 807, the demodulator 809, and the decoder 808 may be implemented by a synthesized modem processor 805. The units perform processing based on radio access technologies (for example, LTE and access technologies of other evolved systems) used in a radio access network.

The controller/processor 803 performs control and management on movements of the terminal to perform processing performed by the terminal A in the foregoing embodiments, for example, to control the transmitter 801 or the receiver 802 to perform data transmission based on time domain symbols indicated by time domain symbol configuration information and/or other processes of the technologies described in the present disclosure. In an example, the controller/processor 803 is configured to support the terminal to perform the processes 501 and 502 in FIG. 5*a*, the processes 501' and 502 in FIG. 5*b*, the processes 501" and 502 in FIG. 5*c*, and the processes 601 and 602 in FIG. 6. The memory 804 is configured to store program code and data used by the terminal.

It may be understood that the transmitter 801 and the receiver 802 may be integrated together and referred to as a transceiver. In other words, the transceiver may implement functions of the transmitter 801 and the receiver 802. The controller/processor 803 may control the transceiver to perform data transmission based on the time domain symbols indicated by the time domain symbol configuration information.

The controller/processor configured to perform the functions of the terminal or the base station in the present disclosure may be a central processing unit (CPU), a general-purpose processor, a digital signal processor (DSP), an disclosure-specific integrated circuit (ASIC), a field programmable gate array (FPGA), or another programmable logic device, transistor logic device, or hardware component, or a combination thereof. The controller/processor may implement or perform various logic blocks, modules, and circuits described with reference to the content disclosed in the present disclosure. The processor may alternatively be a combination for implementing a computing function, for example, a combination including one or more microprocessors, or a combination including a DSP and a microprocessor.

The methods or algorithm steps described with reference to the content disclosed in the present disclosure may be implemented in a hardware manner, or may be implemented in a manner of executing a software instruction by a processor. The software instruction may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other forms well-known in the art. A storage medium used as an example is coupled to the processor, so that the processor can read information from the storage medium, and can write information into the storage medium. Certainly, alternatively, the storage medium may be a part of the processor. The processor and the storage medium may be located in an ASIC. In addition, the ASIC may be located in the user equipment. Certainly, the processor and the storage medium may alternatively exist in the user equipment as discrete assemblies.

A person of skill in the art should be aware that in one or more of the foregoing examples, the functions described in the present disclosure may be implemented by using hardware, software, firmware, or any combination thereof. When this disclosure is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general or dedicated computer.

A person skilled in the art may understand that the accompanying drawing is merely a schematic diagram of one embodiment, and modules or processes in the accompanying drawing are not necessarily required for implementing the present disclosure.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made within the principle of the present disclosure shall fall within the protection scope of the present disclosure.

What is claimed is:

1. A data transmission method comprising:
  sending, by a base station, first time domain symbol configuration information, wherein the first time domain symbol configuration information indicates one or more first time domain symbols allocated to a first terminal having a first scheduling period, the first scheduling period comprising at least one time domain symbols used for data transmission;
  sending, by the base station, second time domain symbol configuration information, wherein the second time domain symbol configuration information indicates one or more second time domain symbols allocated to a second terminal associated with the base station having a second scheduling period, the second scheduling period comprising a plurality of time domain symbols used for data transmission, the second scheduling period being longer than the first scheduling period, and the plurality of time domain symbols comprises the one or more first time domain symbols and one or more second time domain symbols not allocated to the first terminal; and
  performing, by the base station, data transmission with the first terminal according to the one or more first time domain symbols and with the second terminal according to the one or more second time domain symbols.

2. The method according to claim 1, further comprising:
  sending, by the base station, a reference signal in the one or more first time domain symbols or the one or more second time domain symbols.

3. The method according to claim 1, wherein a quantity of the one or more first time domain symbols is one of parameters used to determine a transport block size (TBS) of the first terminal in a scheduling period.

4. The method according to claim 1, wherein
  the sending, the base station, first time domain symbol configuration information comprises:
  sending, by the base station, the first time domain symbol configuration information by using a signaling message; or
  sending, by the base station, the first time domain symbol configuration information by using downlink control information (DCI).

5. A base station comprising:
  a transceiver configured to:
  send first time domain symbol configuration information, wherein the first time domain symbol configuration information indicates one or more first time domain symbols allocated to a first terminal having a first scheduling period, the first scheduling period comprising at least one time domain symbols used for data transmission; and
  send second time domain symbol configuration information, wherein the second time domain symbol configuration information indicates one or more second time domain symbols allocated to a second terminal associated with the base station having a second scheduling period, the second scheduling period comprising a plurality of time domain symbols used for data transmission, the second scheduling period being longer than the first scheduling period, and the plurality of time domain symbols comprises the one or more first time domain symbols and one or more second time domain symbols not allocated to the first terminal;

a processor; and a memory comprising a program to be executed in the processor, the program comprising instructions configured to control the transceiver to perform data transmission with the first terminal according to the one or more first time domain symbols and with the second terminal according to the one or more second time domain symbols.

6. The base station according to claim 5, wherein the transceiver is further configured to send a reference signal in the one or more first time domain symbols or the one or more second time domain symbols.

7. The base station according to claim 5, wherein a quantity of the one or more first time domain symbols is one of parameters used to determine a transport block size (TBS) of the first terminal in a scheduling period.

8. The base station according to claim 5, wherein the transceiver is configured to:

send the first time domain symbol configuration information by using a signaling message; or send the first time domain symbol configuration information by using downlink control information (DCI).

9. The base station according to claim 5, wherein the first time domain symbol configuration information comprises a time domain symbol configuration identifier; and the time domain symbol configuration identifier identifies a configuration that indicates the one or more first time domain symbols and that is preconfigured on the first terminal.

10. The base station according to claim 5, wherein the program comprises further instructions configured to control the transceiver to send data to the first terminal in the one or more first time domain symbols; and the plurality of time domain symbols used for data transmission do not comprise a time domain symbol occupied by a physical downlink control channel (PDCCH).

11. The base station according to claim 5, wherein the program comprises further instructions configured to control the transceiver to receive, in the one or more first time domain symbols, data sent by the first terminal; and the plurality of time domain symbols used for data transmission do not comprise a time domain symbol occupied by a demodulation reference signal (DMRS).

12. A first terminal comprising:

a transceiver configured to receive time domain symbol configuration information from a base station, wherein the time domain symbol configuration information indicates one or more first time domain symbols allocated to the first terminal having a first scheduling period, the first scheduling period comprising at least one time domain symbols used for data transmission, the first scheduling period being shorter than a second scheduling period of a second terminal connected to the base station comprising a plurality of time domain symbols, and the plurality of time domain symbols comprises the one or more first time domain symbols and one or more second time domain symbols not allocated to the first terminal;

a processor; and a memory comprising a program to be executed in the processor, the program comprising instructions configured to control the transceiver to perform data transmission according to the one or more first time domain symbols.

13. The first terminal according to claim 12, wherein the transceiver is further configured to receive a reference signal in the one or more first time domain symbols or the one or more second time domain symbols.

14. The first terminal according to claim 12, wherein a transport block size (TBS) of the first terminal in a scheduling period is determined based on a quantity of the one or more first time domain symbols.

15. The first terminal according to claim 12, wherein the transceiver is configured to:

receive a signaling message, wherein the signaling message comprises the time domain symbol configuration information; or receive downlink control information (DCI), wherein the DCI comprises the time domain symbol configuration information.

16. The first terminal according to claim 12, wherein the time domain symbol configuration information comprises a time domain symbol configuration identifier; and the time domain symbol configuration identifier is used to identify a configuration that indicates the one or more first time domain symbols and that is preconfigured on the first terminal.

17. The first terminal according to claim 12, wherein the program further comprises instructions configured to control the transceiver to receive data in the one or more first time domain symbols; and the plurality of time domain symbols used for data transmission do not comprise a time domain symbol occupied by a physical downlink control channel (PDCCH).

18. The first terminal according to claim 12, wherein the program further comprises instructions configured to control the transceiver to send data in the one or more first time domain symbols; and the plurality of time domain symbols used for data transmission do not comprise a time domain symbol occupied by a demodulation reference signal (DMRS).

* * * * *